United States Patent

Matsuo et al.

(10) Patent No.: US 7,779,044 B2
(45) Date of Patent: Aug. 17, 2010

(54) LOAD SIMULATOR, COMPUTER READABLE MEDIUM, COMPUTER, AND LOAD SIMULATING METHOD

(75) Inventors: Koutarou Matsuo, Yokohama (JP); Tooru Higeta, Yokohama (JP); Masayuki Ito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 11/512,260

(22) Filed: Aug. 30, 2006

(65) Prior Publication Data

US 2007/0239421 A1 Oct. 11, 2007

(30) Foreign Application Priority Data

Mar. 27, 2006 (JP) .............................. 2006-086331

(51) Int. Cl.
*G06F 17/30* (2006.01)
(52) U.S. Cl. ...................................... 707/802; 717/120
(58) Field of Classification Search ................ 707/609, 707/705, 769, 802; 717/120
See application file for complete search history.

(56) References Cited

U.S. PATENT DOCUMENTS 6,785,882 B1* 8/2004 Goiffon et al. .............. 717/120
6,823,311 B2* 11/2004 Tetsumoto ................ 704/270.1
2005/0216234 A1* 9/2005 Glas et al. ................... 702/186

FOREIGN PATENT DOCUMENTS

JP 2005-332139 A 12/2005

OTHER PUBLICATIONS

Exchange 2000 Server Resource Kit, Load Simulator, Feb. 1, 2003, pp. 1-2.*

* cited by examiner

*Primary Examiner*—Fred I Ehichioya
(74) *Attorney, Agent, or Firm*—Fujitsu Patent Center

(57) ABSTRACT

A load simulator is used to apply access load on a web server device as a test target using a plurality of virtual web clients each of which transmits a request message and receives a response message in order according to a given scenario. The load simulator makes a computer function as search means for searching page data of a response message for predetermined character strings when a virtual web client receives the response message from the web server device through a communication device, source modifying means for overwriting the predetermined character string searched by the search means by replacing characters of a part of the string to disable a function provided by the original character string, and output means for passing the page data that is overwritten by the source modifying means to the viewer.

6 Claims, 12 Drawing Sheets

Fig.4

Figure 1:
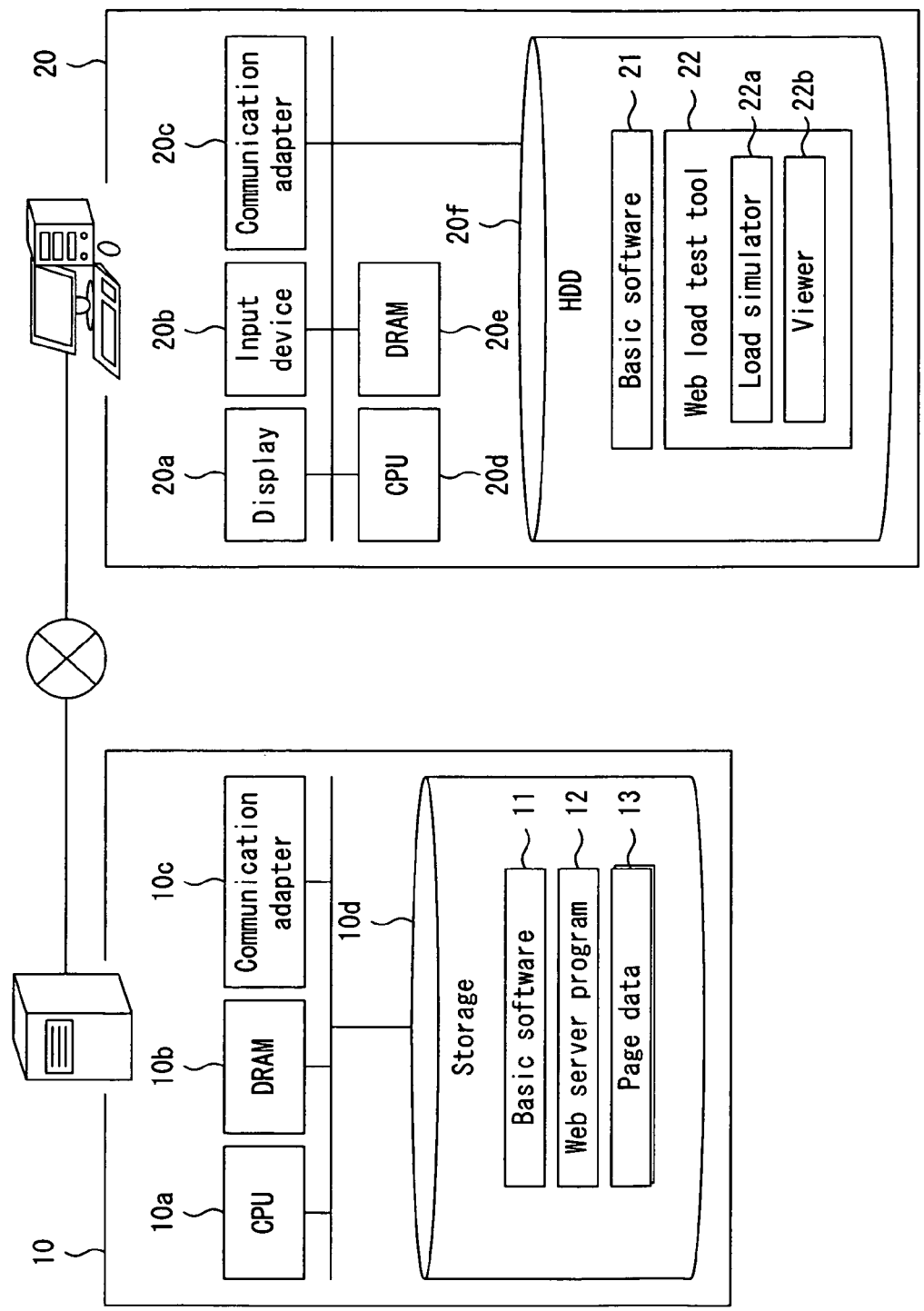

```
Before disabling
<html>
<head>
<title>Welcome</title>
</head>
<body>
<script language="JavaScript">
<!--
    alert("JavaScript has been loaded.");
//-->
</script>
<h1>Load JavaScript</h1>
<body>
</html>
```

Fig.5

After disabling

```
<html>
<head>
<title>Welcome</title>
</head>
<body>
<script language="JavaScript">    ← Entity reference expression
<!--
    alert("JavaScript has been loaded.");
//-->
</script>
<h1>Load JavaScript</h1>
<body>
</html>
```

Fig.6

Before disabling

```
<html>
<head>
<title>Welcome</title>
</head>
<body onLoad="javascript:alert(' onLoad event occurs.');">
    <h1>oonLoad event</h1>
</body>
</html>
```

LOAD SIMULATOR, COMPUTER READABLE MEDIUM, COMPUTER, AND LOAD SIMULATING METHOD

BACKGROUND OF THE INVENTION

The present invention relates to a load simulator that is a program for applying access load on a web server device and to a computer on which the program runs.

A web load testing apparatus includes a load simulator and a viewer to observe a state of a web server device as a test target while applying a load thereto. The load simulator generates a plurality of threads that function as virtual web clients; gives scenarios, each of which defines the request order for page data in the web server device as a test target, to the generated virtual web clients; and makes the clients transmit request messages and receive response messages as defined in the scenario. Thereby, the load simulator saves the response messages that are received by the virtual web clients from the web server device, and records a log of the responses. The viewer displays a web page based on the page data in the response messages, or displays a list of the log information about the responses.

Some viewers mentioned above have a function to display a web page instantly every time any virtual web client receives a response message from a web server device as a test target, based on page data in the response message.

However, if such a viewer includes means for issuing a request of data of an image that is embedded into a web page from page data thereof in a response message and means for opening a new window, the web server device executes processes that are not related to the access load test, which leaves a response log unrelated to the scenario and opens a window other than the window of the viewer.

SUMMARY OF THE INVENTION

The present invention is accomplished to solve the above-mentioned conventional problems, and an object thereof is to prohibit a process unrelated to an access load test even if a viewer displays a responded web page instantly.

A load simulator of the present invention is used to apply access load on a web server device as a test target using a plurality of virtual web clients each of which transmits a request message and receives a response message in order according to a given scenario. The load simulator makes a computer function as search means for searching page data of a response message for predetermined character strings when a virtual web client receives the response message from the web server device through a communication device, source modifying means for overwriting the predetermined character string searched by the search means by replacing characters of a part of the string to disable a function provided by the original character string, and output means for passing the page data that is overwritten by the source modifying means to a viewer.

With this construction, since the predetermined character string in the page data of the response message is overwritten by replacing characters of a part of the string to disable a function provided by the original character string before the virtual web client passes the response message received from the web server device of the test target to the viewer, the viewer displays the web page based on the page data of the response message without executing a process that corresponds to the function of the original character string and is unrelated to the access load test.

Therefore, according to the present invention, a process unrelated to an access load test is prohibited even if a viewer displays a responded web page instantly.

DESCRIPTION OF THE ACCOMPANYING DRAWINGS

Figure 2:
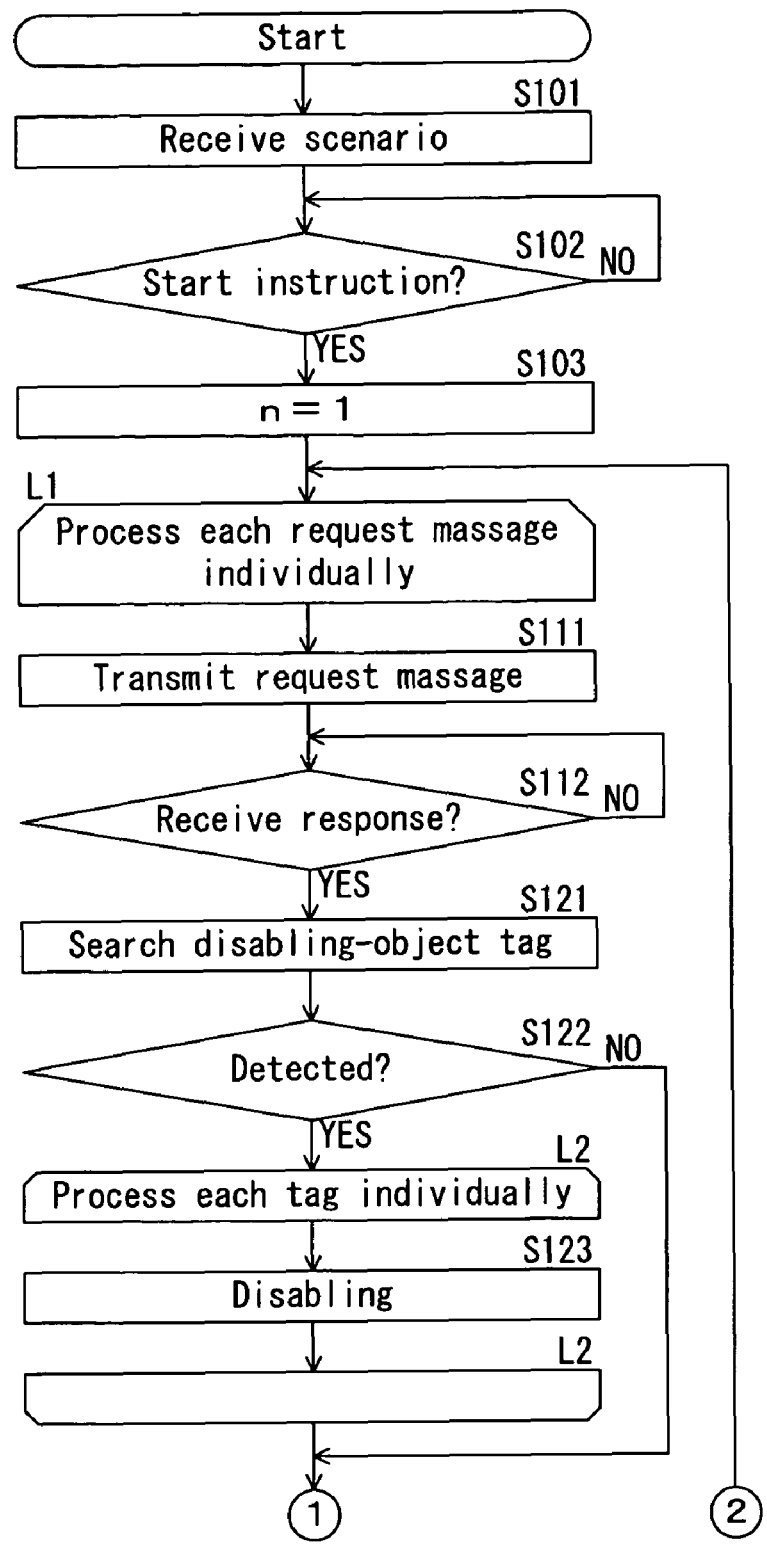
Figure 3:
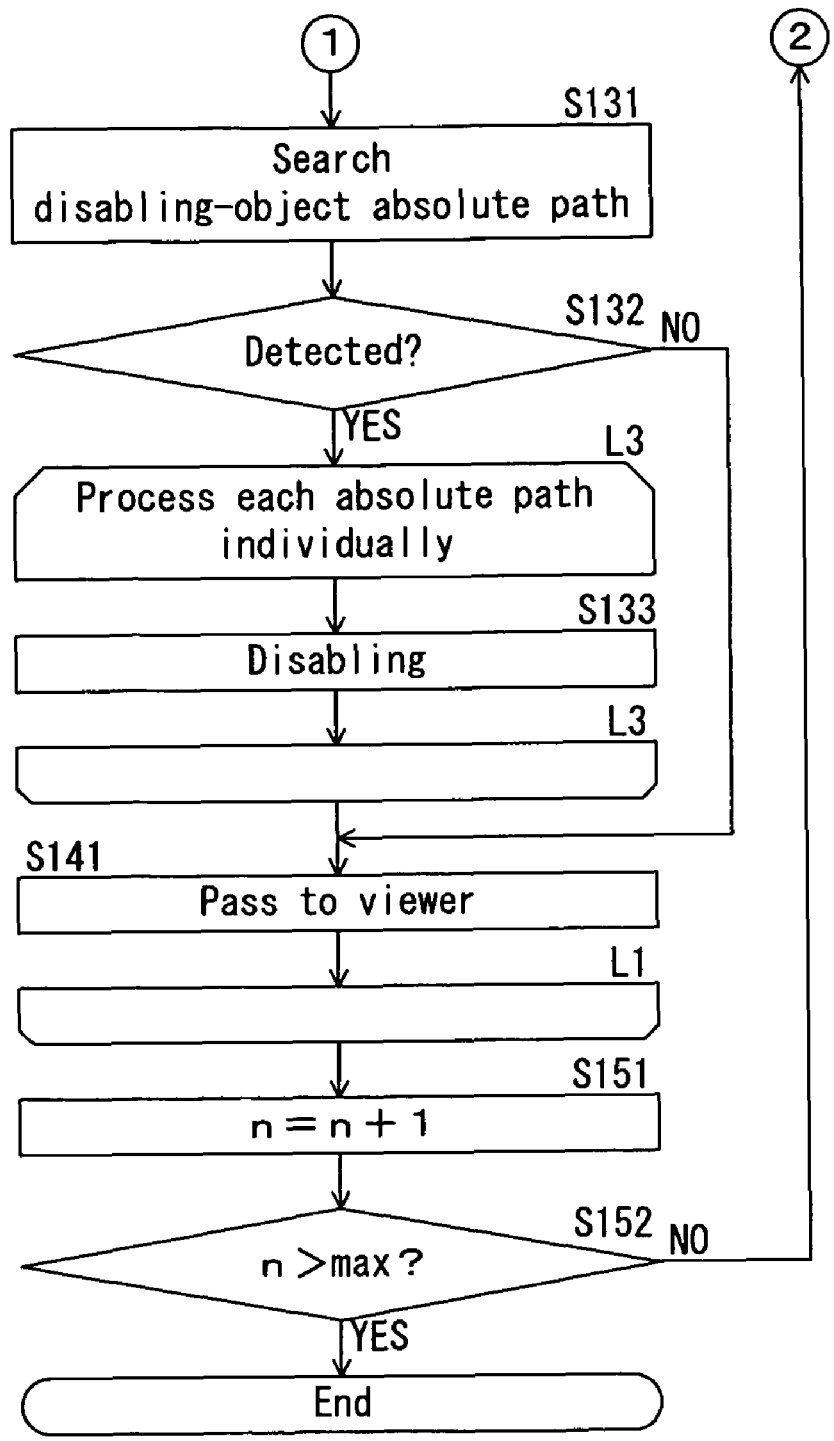
Figure 7:
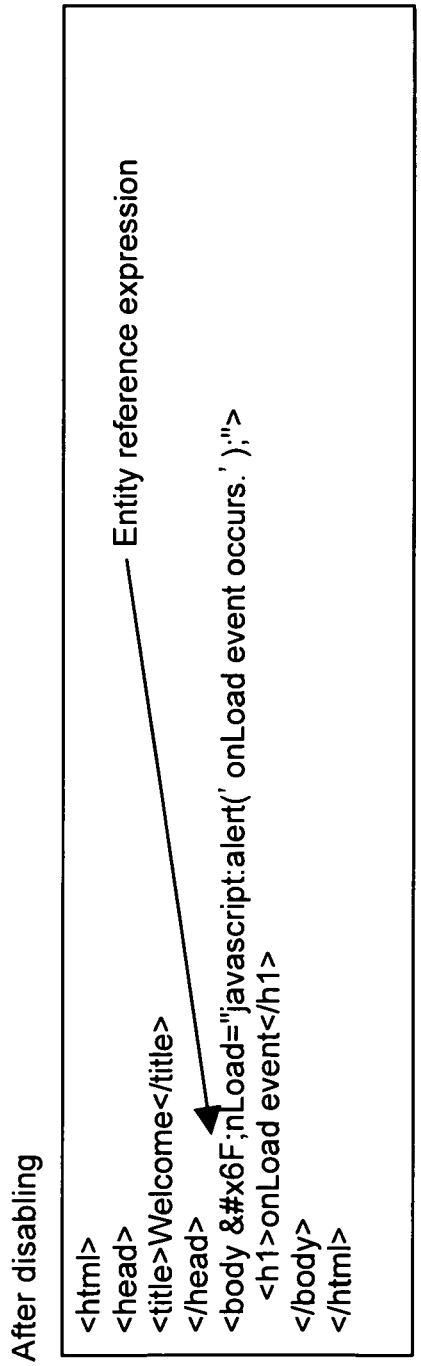
Figure 8:
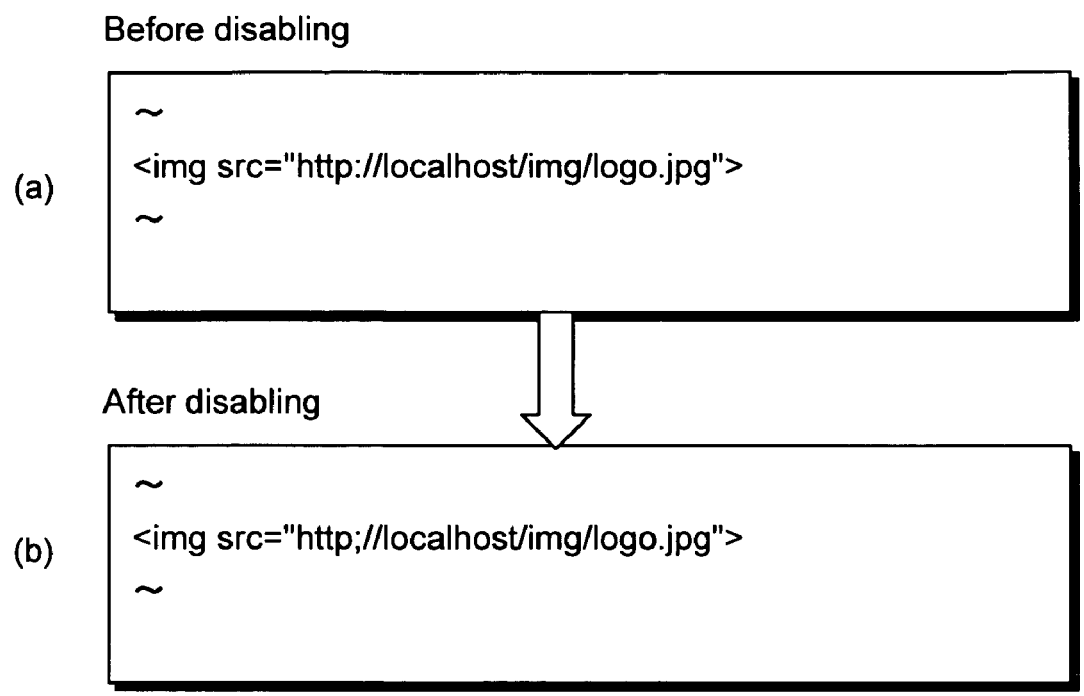
Figure 9:
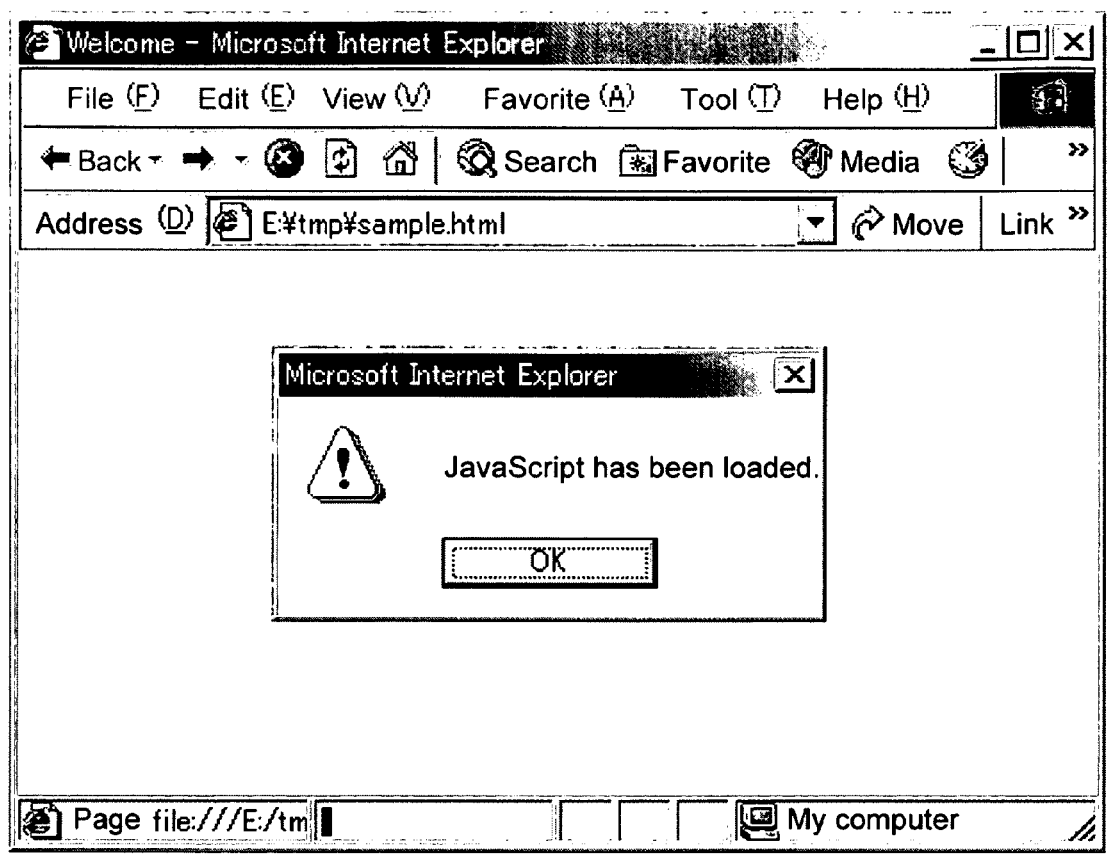
Figure 10:
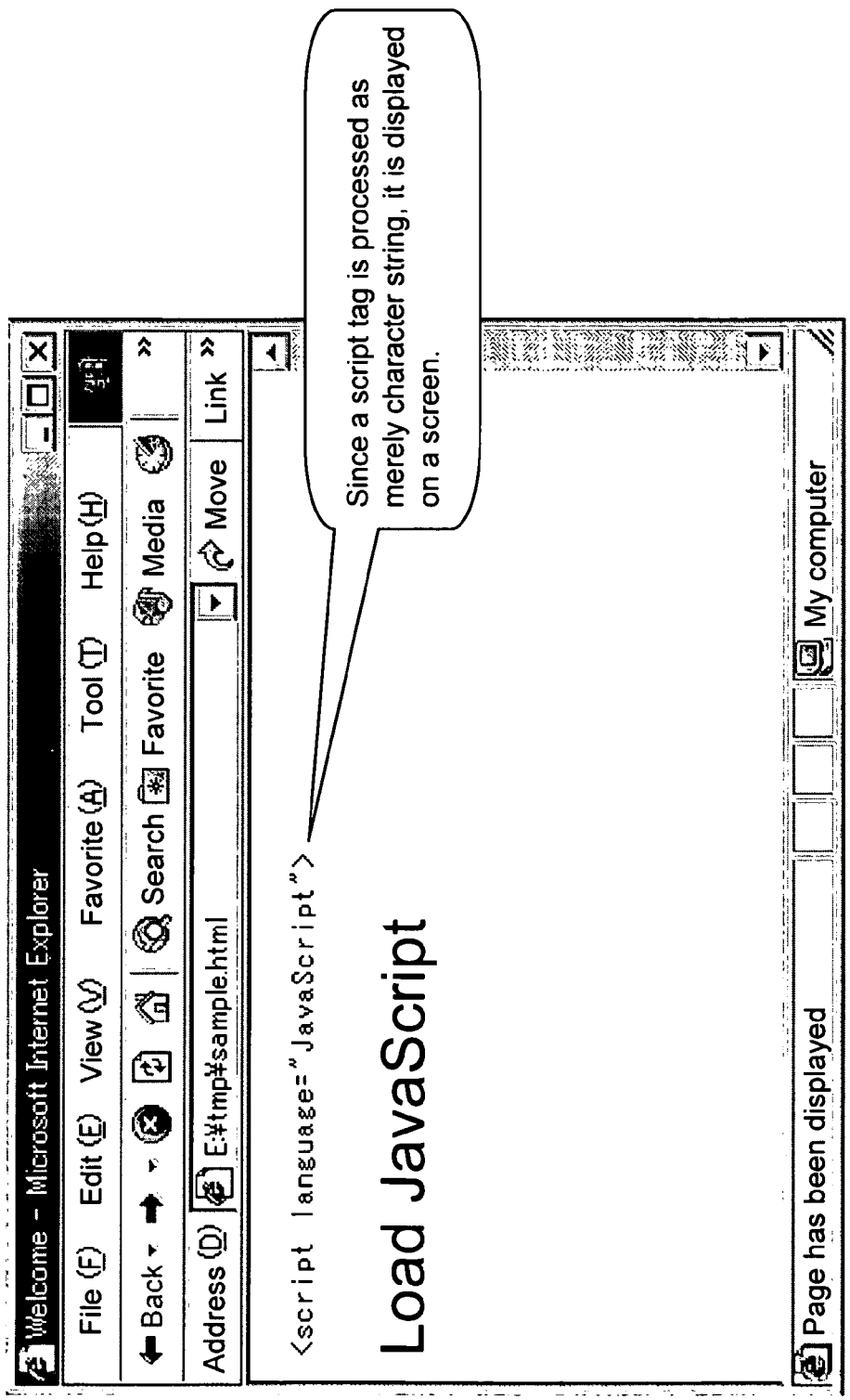
Figure 11:
Figure 12:
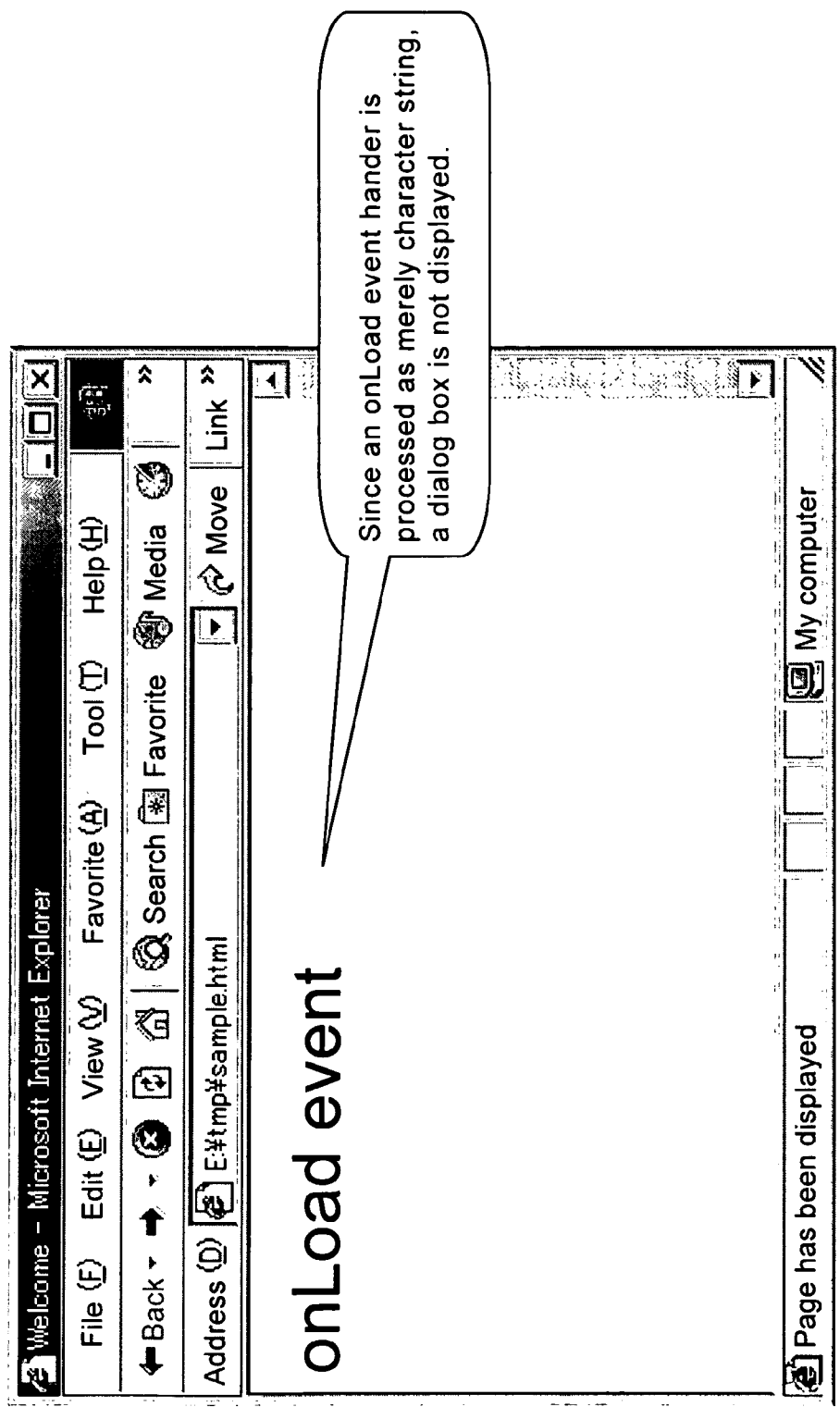

FIG. 1 is a block diagram that shows a web server device that is a target of a web load test and a web load testing apparatus that executes the test according to an embodiment of the present invention, FIG. 2 is a flowchart showing a first half of a process executed by a thread generated as a virtual web client, FIG. 3 is a flow chart showing a latter half of the process executed by the thread generated as a virtual web client, FIG. 4 shows an example of page data containing a script tag, FIG. 5 shows a condition where the script tag in the page data of FIG. 4 has been disabled, FIG. 6 shows an example of page data containing an onload tag, FIG. 7 shows a condition where the onload tag in the page data of FIG. 6 has been cancelled, FIG. 8A shows an example of page data containing an absolute path, FIG. 8B shows a condition where the end of the protocol section of the absolute path of FIG. 8A has been replaced by the semicolon, FIG. 9 shows the web page displayed based on the page data of FIG. 4, FIG. 10 shows the web page displayed based on the page data of FIG. 5, FIG. 11 shows the web page displayed based on the page data of FIG. 6, and FIG. 12 shows the web page displayed based on the page data of FIG. 7.

DESCRIPTION OF THE PREFERRED EMBODIMENTS

There will now be described an embodiment of the present invention with reference to the accompanying drawings.

FIG. 1 is a block diagram showing a web server device 10 that is a target of a web load test and a web load testing apparatus 20 that executes the test according to the embodiment of the present invention.

The web server device 10 is a general purpose computer in which programs for implementing a web server function are installed. The computer that constitutes the web server device 10 contains hardware, such as a CPU (Central Processing Unit) 10a, a DRAM (Dynamic Random Access Memory) 10b, a communication adapter 10c, and storage 10d. The basic software 11, which provides fundamental functions to many pieces of application software, is installed in the storage 10d. For example, the fundamental functions include management of input/output data via the communication adapter 10c, management of memory areas of the DRAM 10b and the storage 10d, and the like. The storage 10d also stores a web server program 12 and page data 13 that makes a general purpose computer operate as a web server device.

Receiving a request from a web client device (not shown), the web server program 12 reads a requested page data from the inner storage or creates a requested page data, and transmits it to the web client device as a source of request through the communication adapter 10c. The page data 13 is HTML (HyperText Markup Language) source data for displaying a web page. This page data 13 may include the information that displays a link for jumping to another web page. Further, the page data 13 may include a server side program or a client side program.

The web load testing apparatus 20 is a device for executing a web load test for the web server device 10 as a test target. This web load testing apparatus 20 is a general personal computer in which the program for implementing a web load test tool function has been installed. The personal computer that constitutes the web load testing apparatus 20 is provided with a display 20a such as a liquid crystal display, input devices 20b such as a keyboard and a mouse, and a main unit that is connected to these devices 20a and 20b. The main unit contains hardware such as a communication adapter 20c, a CPU 20d, a DRAM 20e and storage 20f. The storage 20f stores basic software 21.

The web load testing apparatus 20 stores a web load test tool (program) 22 that makes a personal computer operate as the web load testing apparatus. The web load test tool 22 includes modular programs (components) of a load simulator 22a, a viewer 22b and a scenario generation module 22c.

The load simulator 22a applies access load onto the web server device as a test target. Specifically, the load simulator 22a creates a plurality of threads that function as virtual web clients. Then the load simulator 22a gives a scenario, which defines request order of page data in the web server device of the test target, to the virtual web clients so that the virtual web clients execute the requests according to the scenario. As a result, the load simulator 22a saves response messages that are received by the respective virtual web clients from the web server device and records a log of the responses.

The viewer 22b displays a web page based on the page data in the response message and lists the log information of the responses.

Next, the process that is executed by a thread generated as a virtual web client in the embodiment will be described.

FIGS. 2 and 3 are flowcharts showing the process that is executed by the thread generated as a virtual web client.

In the first step S101 after the start of process, the thread, that is, the CPU 20d that executes the thread, acquires a scenario from the load simulator 22a. A scenario consists of some request messages that are transmitted by a virtual web client during the web load test and transmission orders thereof. Every URL (Uniform Resource Locator) in the request messages included in the scenario is assigned to the page data 13 of the web server device 10 used as a test target.

In the next step S102, the thread waits until the start instruction of the web load test is received from the load simulator 22a. Receiving the start indication of a web load test, the thread proceeds the process to step S103.

In step S103, the thread substitutes an initial value "1" for a variable n for memorizing the use count of the scenario, and then, it executes the first processing loop L1.

In the first processing loop L1, the thread executes step S111, S112, S121-S123, S131-S133, and S141 in order for each of the request messages in the scenario acquired in step S101.

In step S111, the thread transmits a processing target request message.

In the next step S112, the thread waits until a response message is received as a response from the destination. Receiving the response message, the thread proceeds the process to step S121.

In step S121, the thread searches the page data in the response message received in step S112 for disabling-object tags. Here, there are "<script-", "<object-", "<applet-", "<embed-", "<-onload-" as disabling-object tags.

In the next step S122, the thread determines whether a disabling-object tag is detected in the page data of the response message received in step S112.

The CPU 20d that executes the process in steps S121 and S122 corresponds to the search means mentioned above. And in Step S122, when the disabling-object tag is detected from the page data in the response message received in step S112, the thread branches the process from step S122 to execute a second process loop L2.

In the second process loop L2, the thread executes a process in step S123 for each of the disabling-object tags detected in step S121 in turn.

In step S123, the thread disables the disabling-object tags in this page data. Specifically, when the disabling-object tag is "<script-", the thread replaces "s" with characters "s" that is expressed by an entity reference form. That is, "<script-" is replaced with "<script-". FIG. 4 shows the page data before disabling the tag "<script-". FIG. 5 shows the page data after disabling the tag "<script-". When a disabling-object tag is "<-onload-", the thread replaces "o" with characters "o" that is expressed by an entity reference form. That is, "<-onload-" is replaced with "<-onload-". FIG. 6 shows the page data before disabling the tag "<-onload-". FIG. 7 shows the page data after disabling the tag "<-onload-".

The CPU 20d that executes the process in step S111 as the thread corresponds to the source modifying means mentioned above.

When the thread finishes the process in step S123 for all the disabling-object tags detected at step S121, the thread leaves the second process loop L2 and proceeds the process to step S131.

On the other hand, when a disabling-object tag is not detected in step S122 from the page data in the response message that is received in step S112, the thread branches the process from step S122 and proceeds the process to step S131 without disabling a tag.

In step S131, the thread searches the page data in the response message that is received in step S112 for a disabling-object absolute path. Here, the disabling-object absolute path means an absolute path included in the tag "<script-", "<frame-", "<iframe-", "<img-", "<link-", "<a-", or "<area-".

In the next step S132, the thread determines whether a disabling-object absolute path is detected from the page data in the response message that is received in step S112. The CPU 20d that executes the process in steps S131 and S132 as a function of the thread corresponds to the search means mentioned above.

When the disabling-object absolute paths are detected from the page data in the response message, the thread branches the process from step S132 and executes the third process loop L3.

In the third process loop L3, the thread executes the process in step S133 for each of the disabling-object absolute paths detected in step S131.

In step S133, the thread disables the absolute path in the page data. Specifically, the thread replaces a colon in the end of the protocol section in the disabling-object absolute path with a semicolon. FIG. 8A shows the image tag containing an absolute path before replacing the end of the protocol portion with a semicolon. FIG. 8B shows the image tag containing the absolute path after replacing the end of the protocol portion with a semicolon.

The CPU 20d that executes the process in step S133 as the thread corresponds to the source modifying means mentioned above.

When the thread finishes the process in step S133 for all the disabling-object absolute paths detected in step S131, the thread leaves the third process loop L3 and proceeds the process to step S141.

In step S141, the thread passes the page data after the execution of steps S121-S123, S131-S133 to the viewer 22b. Receiving the page data, the viewer 22b displays a web page on the display 20a based on the page data.

The CPU 20d that executes the process in step S141 as the thread corresponds to the output means mentioned above.

When the thread finishes the process in steps S111, S112, S121-S123, S131-S133, and S141 for all the request messages in the scenario that is acquired in step S101, the thread leaves the first process loop L1 and proceeds the process to step S151.

In step S151, the thread increments the value of the variable n by 1.

In the next step S152, the thread determines whether the value of the variable n goes beyond a predetermined upper limit.

When the value of the variable n does not go beyond the predetermined upper limit, the thread branches the process from step S152 to start the first process loop L1.

On the other hand, when the value of the variable n goes beyond the predetermined upper limit, the thread finishes the process shown in FIGS. 2 and 3.

Next, the operations and effects of the load simulator 22a of the embodiment will be described.

As mentioned above, all the threads, which are generated by the load simulator 22a as virtual web clients, apply access load onto the web server device 10 as a test target according to scenarios. When each of the threads applies the access load, each thread confirms the presence or absence of a disabling-object tag and the presence or absence of a disabling-object absolute path in page data of a response message whenever each thread receives a response message from the web server device 10 (steps S121, S122, S131, and S132). If the page data includes a disabling-object tag or a disabling-object absolute path, a thread disables them (step S123, S133) and then, passes the page data to the viewer 22b (Step S141).

A disabling-object tag in page data of a response message has a function to execute a process unrelated to an access load test such as issue of a request of image data embedded into a web page or starting of a new window when the viewer 22b performs a rendering.

For example, when a rendering is performed based on the page data of FIG. 4 before disabling a disabling-object tag "<script-", a new window other than the window of the viewer 22b will be generated as shown in FIG. 9. However, when a rendering is performed based on the page data of FIG. 5 after disabling the disabling-object tag "<script-", a new window other than the window of viewer 22b is not generated as shown in FIG. 10. Therefore, a process unrelated to an access load test cannot be executed.

Further, when a rendering is performed based on the page data of FIG. 6 before disabling a disabling-object tag "<-onload-", a new window other than the window of the viewer 22b will be generated as shown in FIG. 11. However, when a rendering is performed based on the page data of FIG. 7 after disabling the disabling-object tag "<-onload-", a new window other than the window of the viewer 22b is not generated as shown in FIG. 12. Therefore, a process unrelated to an access load test cannot be executed.

Further, when a disabling-object absolute path included in page data is enabled as shown in FIG. 8A, a request to the absolute path is issued when the viewer 22b performs a rendering. However, if the disabling-object absolute path included in the page data has been disabled as shown in FIG. 8B, the absolute path becomes ineffective on a communication protocol, which prohibits a request. Therefore, a process unrelated to an access load test cannot be executed.

In the above-described embodiment, although the absolute path is disabled, the relative path does not need to be disabled. It is because an image tag "<img-" with a relative path does not issue a request to the web server device 10.

What is claimed is:

1. A load simulator that is used to apply access load on a web server device as a test target using a plurality of virtual web clients each of which transmits a request message and receives a response message in order according to a given scenario, said load simulator comprising:

a processor; and a storage device storing computer-readable instructions, execution of the computer-readable instructions by the processor configuring the processor to include:

a search component to search page data of a response message for a character string indicating an element type name of a mark-up element for invoking a request when a virtual web client receives said response message from said web server device through a communication device;

a source modifying component to overwrite said character string searched by said search component by replacing characters of at least a part of said character string with characters, wherein the replaced character string does not invoke the request; and an output component to pass said page data that is overwritten by said source modifying component to a viewer.

2. A load simulator that is used to apply access load on a web server device as a test target using a plurality of virtual web clients each of which transmits a request message and receives a response message in order according to a given scenario, said load simulator comprising:

a processor; and a storage device storing computer-readable instructions, execution of the computer-readable instructions by the processor configuring the processor to include:

a search component to search page data of a response message for a character string indicating an absolute path included in a mark-up element when a virtual web client receives said response message from said web server device through a communication device, wherein the absolute path indicates an address of a data file embedded into the page data;

a source modifying component to overwrite said character string searched by said search component by changing at least a part of a protocol section of said absolute path; and an output component to pass said page data that is overwritten by said source modifying component to a viewer.

3. The load simulator according to claim 2, wherein said source modifying component overwrites said character string by replacing a colon of said absolute path with a semicolon.

4. A computer readable medium storing a load simulator that is used to apply access load on a web server device as a test target using a plurality of virtual web clients each of which transmits a request message and receives a response message in order according to a given scenario, said load simulator making a computer perform:

searching page data of a response message for a character string indicating an element type name of a mark-up element for invoking a request when a virtual web client receives said response message from said web server device through a communication device;

overwriting said character string searched by said searching by replacing characters of at least a part of said character string with characters, wherein the replaced character string does not invoke the request; and passing said page data that is overwritten by said overwriting to a viewer.

5. A computer that is used to apply access load on a web server device as a test target using a plurality of virtual web clients each of which transmits a request message and receives a response message in order according to a given scenario, said computer comprising:

a search component to search page data of a response message for a character string indicating an element type name of a mark-up element for invoking a request when a virtual web client receives said response message from said web server device through a communication device;

a source modifying component to overwrite said character string searched by said search component by replacing characters of at least a part of said character string with characters, wherein the replaced character string does not invoke the request; and an output component to pass said page data that is overwritten by said source modifying component to a viewer.

6. A load simulating method, performed by a computer including a processor and a storage device, that is used to apply access load on a web server device as a test target using a plurality of virtual web clients each of which transmits a request message and receives a response message in order according to a given scenario, said method executed by the processor comprising:

searching page data of a response message for a character string indicating an element type name of a mark-up element for invoking a request when a virtual web client receives said response message from said web server device through a communication device and stores said response message in the storage device;

overwriting said character string searched by said searching by replacing characters of at least a part of said character string with characters, wherein the replaced character string does not invoke the request; and passing said page data that is overwritten by said overwriting to a viewer.

* * * * *